United States Patent
Emery et al.

(10) Patent No.: US 9,562,967 B2
(45) Date of Patent: *Feb. 7, 2017

(54) CONTROLLING A RADAR SYSTEM AND THE PROVISION OF A RANGE-DOPPLER TARGET IMAGE SIGNATURE

(71) Applicant: BAE SYSTEMS PLC, London (GB)

(72) Inventors: David James Emery, Brentwood (GB); Peter Donald Fraser Tait, Chelmsford (GB)

(73) Assignee: BAE SYSTEMS plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,802

(22) Filed: Apr. 24, 2015

(65) Prior Publication Data

US 2015/0226847 A1 Aug. 13, 2015

Related U.S. Application Data

(63) Continuation of application No. 13/821,522, filed as application No. PCT/GB2011/051644 on Sep. 1, 2011, now Pat. No. 9,063,217.

(30) Foreign Application Priority Data

Sep. 8, 2010 (GB) .................................. 1014960.7
May 4, 2011 (EP) .................................. 11275071

(51) Int. Cl.
*G01S 13/58* (2006.01)
*G01S 7/292* (2006.01)
(Continued)

(52) U.S. Cl.
CPC ............ *G01S 13/582* (2013.01); *G01S 7/2927* (2013.01); *G01S 7/412* (2013.01); *G01S 7/415* (2013.01)

(58) Field of Classification Search
CPC .............. G01S 7/02; G01S 7/28; G01S 7/285; G01S 7/292; G01S 7/2923; G01S 7/2927; G01S 7/41; G01S 7/411; G01S 7/412; G01S 7/415; G01S 13/02; G01S 13/50; G01S 13/58; G01S 13/581; G01S 13/582; G01S 7/021; G01S 7/414; G01R 23/16; G01R 23/165; G01R 23/167; F41H 11/00; H04W 99/00
(Continued)

(56) References Cited

U.S. PATENT DOCUMENTS 3,713,144 A * 1/1973 Letten ..................... G01S 7/414
342/192
3,950,749 A 4/1976 Wiedemann
(Continued)

FOREIGN PATENT DOCUMENTS

WO 9801770 1/1998

OTHER PUBLICATIONS

International Search Report received for PCT/GB2011/051644. Mail Date: Dec. 15, 2011. 3 pages.
(Continued)

*Primary Examiner* — Bernarr Gregory
(74) *Attorney, Agent, or Firm* — Finch & Maloney PLLC

(57) ABSTRACT

A method of controlling a radar system by: receiving a radar return signal from a target and generating a range-Doppler target image signature of the target; selecting a spectral line within the range-Doppler target image signature from a modulation feature on the target which includes an effective point scatterer; providing a range profile for the spectral line; obtaining a reference range profile of a reference point scatterer; and determining a difference between a power at a range shorter than a peak corresponding to the modulation feature in the range profile and a power at a corresponding
(Continued)

range of the reference range profile. The method may further include controlling provision of the range-Doppler target image signature based on the difference.

19 Claims, 6 Drawing Sheets

(51) Int. Cl.
  *G01S 7/41* (2006.01)
  *G01S 13/00* (2006.01)
  *G01S 7/00* (2006.01)

(58) Field of Classification Search
  USPC ........ 342/27, 28, 82, 89–103, 175, 192–197
  See application file for complete search history.

(56) References Cited

U.S. PATENT DOCUMENTS

| | | | |
|---|---|---|---|
| 3,974,328 A | 8/1976 | Thomas et al. | |
| 4,001,820 A * | 1/1977 | Rosenbaum | G01S 7/292 342/192 |
| 4,069,468 A | 1/1978 | Bartram | |
| 4,101,890 A | 7/1978 | Goyard | |
| 4,225,864 A | 9/1980 | Lillington | |
| 4,415,898 A | 11/1983 | Gaunaurd et al. | |
| 4,484,193 A * | 11/1984 | Bellew | G01S 13/02 342/192 |
| 4,490,718 A * | 12/1984 | Opitz | G01S 7/415 342/192 |
| 4,559,537 A | 12/1985 | Pearson, Jr. et al. | |
| 4,633,255 A | 12/1986 | Trizna | |
| 4,641,137 A * | 2/1987 | Opitz | G01S 7/415 342/192 |
| 4,641,138 A * | 2/1987 | Opitz | G01S 7/415 342/192 |
| 4,673,940 A * | 6/1987 | Barley | G01S 13/50 342/175 |
| 4,992,797 A * | 2/1991 | Gjessing | G01S 7/412 342/90 |
| 5,191,343 A | 3/1993 | Danzer et al. | |
| 5,424,749 A | 6/1995 | Richmond | |
| 5,565,872 A | 10/1996 | Prevatt et al. | |
| 5,867,257 A * | 2/1999 | Rice | F41H 11/00 342/192 |
| 6,222,481 B1 | 4/2001 | Abrahamson et al. | |
| 6,424,138 B1 * | 7/2002 | Brownstein | G01R 23/167 342/192 |
| 6,580,388 B1 * | 6/2003 | Stoyanov | G01S 7/411 342/192 |
| 6,803,876 B2 | 10/2004 | Erkocevic-Pribic | |
| 7,002,509 B2 * | 2/2006 | Karlsson | H04W 99/00 342/192 |
| 7,075,482 B2 * | 7/2006 | Karlsson | G01S 7/021 342/196 |
| 8,588,351 B2 | 11/2013 | Bush et al. | |
| 9,063,217 B2 * | 6/2015 | Emery | G01S 7/2927 |

OTHER PUBLICATIONS

European Search Report received for EP 11275071.6. Mail Date: Nov. 8, 2011. 6 pages.

United Kingdom Search Report received for GB 1014960.7. Date of Search: Mar. 24, 2011.

French, Andrew, "Target recognition techniques for multifunction phased array radar," (Chapter 5). PhD Thesis for the degree of Doctor of Philosophy, University College London, Jan. 2010. pp. 138-181.

Bonanni, et al., "High Range Resolution (HRR) profiling within low elevation search mode," Radar Conference, IEEE. May 26, 2008. pp. 1-6.

\* cited by examiner

CONTROLLING A RADAR SYSTEM AND THE PROVISION OF A RANGE-DOPPLER TARGET IMAGE SIGNATURE

RELATED APPLICATIONS

This application is a continuation of U.S. application Ser. No. 13/821,522, filed Mar. 7, 2013, now U.S. Pat. No. 9,063,217, and entitled "RADAR SYSTEM AND METHODS OF CONTROLLING A RADAR SYSTEM AND THE PROVISION OF A RANGE-DOPPLER TARGET IMAGE SIGNATURE," which is a U.S. National Stage application under 35 U.S.C. §371 of PCT/GB2011/051644, filed Sep. 1, 2011, and entitled "RADAR SYSTEM AND METHODS OF CONTROLLING A RADAR SYSTEM AND THE PROVISION OF A RANGE-DOPPLER TARGET IMAGE SIGNATURE," each of which are incorporated herein by reference in their entireties.

FIELD OF THE DISCLOSURE

The disclosure relates to a method of controlling a radar system. The method further relates to a method of controlling the provision of a range-Doppler target image signature of a target. The disclosure further relates to a radar system arranged to implement a method of controlling a radar system.

BACKGROUND

Range-Doppler target image (RDI) signatures are often used in target recognition applications. In order to accurately extract target features from an RDI signature it is necessary for the range profiles of the RDI signature to have good time sidelobe performance (typically better than 20-25 dB below the level of the peak return for close in local peaks in the profile). If good time sidelobe performance is not achieved, "ghost" reflection sources can appear in the target signature, which can be interpreted as being part of the real target and severely degrade the feature extraction process. In order for the desired time sidelobe performance to be achieved, the radar used to generate the RDI signature must be operating in its linear region. If the radar receiver receives unexpectedly high power radar return signals, for example from a target having a large radar cross-section or at a short range, it will become saturated and the time sidelobe performance and the consequent feature extraction performance will be degraded. There are various known methods for calibrating the time sidelobe performance of a radar system to enable the radar to be set to operate in its linear region, including using a remote point scatterer, such as a corner reflector, a remote delay line transponder, or a closed loop transponder to generate a calibration time sidelobe characteristic.

SUMMARY

According to a first aspect of the disclosure there is provided a method of controlling a radar system, the method including:
receiving a radar return signal from a target and generating a range-Doppler target image signature of the target;
selecting a spectral line within the range-Doppler target image signature from a modulation feature on the target which has an effective point scatterer;
providing a range profile for the spectral line;
obtaining a reference range profile of a reference point scatterer; and
determining a difference between a power at a range shorter than a peak corresponding to the modulation feature in the range profile and a power at a corresponding range of the reference range profile.

In an embodiment, the method includes controlling provision of the range-Doppler target image signature based on the difference.

In an embodiment, the method includes:
determining whether the difference is above a threshold value; and
where the difference is not above the threshold value, generating a first control signal arranged to cause provision of the range-Doppler target image signature, and, where the difference is above the threshold value, generating a second control signal arranged to prevent provision of the range-Doppler target image signature.

The method is able to determine whether the RDI signature that has been generated has suffered any time sidelobe distortion and to control the provision of the RDI signature in dependence on whether distortion has occurred; if distortion is determined to have occurred, provision of the RDI signature is prevented, and if distortion is determined not to have occurred, provision of the RDI signature is enabled. The method may be used to ensure that an RDI signature that is to be used for feature extraction and target recognition is only provided if the RDI signature has not suffered any time sidelobe distortion. The method may allow the quality of an RDI signature to be assessed based on the RDI signature itself, with no additional measurements needed beyond provision of the reference range profile.

In an embodiment, selecting a spectral line includes:
identifying one or more spectral lines having a signal power peak;
generating a range profile for each said spectral line; and
selecting a said spectral line having a range profile having a primary power peak and one or more secondary power peaks, and each said secondary power peak located at a shorter range that the primary power peak having a substantially lower power that the primary power peak.

It has been observed from measurement and analysis of RDI signatures of aircraft corresponding to the "front" of the target, nearest the radar, that strong modulation returns from JEM lines, scanning antennae, rotors and propellers appear as point targets. Hence, "in front" of these modulation sources in the direction of the radar the range profile tends to be due to the inherent time sidelobes of the radar and not due to other modulation sources or scatterers. Any multipath effects present occur "behind" these strong modulation sources resulting in the range profile beyond the radar being a combination of the inherent time sidelobes characteristics of the radar and the multi-path reflections. This means that the range profile in front of these strong modulation scatterers is determined by the radar system's time sidelobes and measuring these characteristics may be used to determine whether the radar signal is being distorted, due to high power signals, for example.

In an embodiment, identifying one or more spectral lines includes selecting the or each of the identified spectral lines corresponding to a modulation feature not located on a skin of the target. It has been determined that there are typically a large number of skin scatterers on the skin of an aircraft and the resulting range profile is complex. As a result, no meaningful time sidelobe characteristic can be extracted from the RDI signature if skin scatterers are used. Using a non-skin scatterer ensures that a usefully simple range profile can be generated.

In an embodiment, selecting a said spectral line includes selecting the spectral line having the highest signal power peak and the said range profile. Using the highest signal power peak may ensure that the secondary power peaks have a substantially lower power that the primary power peak.

In an embodiment, the spectral line includes one of: a jet engine modulation spectral line, a rotor chopping line, a reflection from a scanning antenna and a propeller chopping line. These modulation features act as strong point targets. A jet engine modulation (JEM) line in particular has a relatively simple range profile.

In an embodiment, the reference range profile includes a range profile of a spectral line from a modulation feature of a reference target having an effective point scatterer. The range profile of a spectral line from a modulation feature of a reference target may provide a better reference profile, having sharper resolution peak and lower time sidelobes, than a range profile generated from a remote point target, a remote delay line transponder, or a closed loop transponder.

In an embodiment, the spectral line is identified as being from a modulation feature having an effective point scatterer by: determining a difference between the range width of a primary power peak of a range profile of the spectral line and the range width of a corresponding power peak of the reference range profile; determining whether the difference is above a threshold value; and if the difference is not above the threshold value, identifying the said spectral line as being from a modulation feature having an effective point scatterer.

In an embodiment, the range width includes the full width of the power peak at the 3 dB power point of the peak and the threshold value includes 10 percent of the range width of the power peak of the reference range profile.

In an embodiment, the method includes determining a mean difference between powers at range cells at ranges shorter than a peak corresponding to the modulation feature in the range profile and powers at corresponding range cells of the reference range profile.

In an embodiment, generating the range-Doppler target image signature includes applying a gain, and the method further includes generating a third control signal arranged to change the gain to reduce the power of the returns in a subsequent range-Doppler target image signature. The method may thus be used to control the gain applied during generation of a subsequent RDI signature. If time sidelobe distortion is determined to have occurred, the method may enable the gain applied during generation of the subsequent RDI signature to be reduced in order to mitigate the distortion. It will be appreciated that gain here includes both positive gain and negative gain (attenuation), and changing the gain to reduce the power of the returns in a subsequent RDI signature may therefore include reducing a positive gain or increasing a negative gain. The method may thus be used to provide dynamic calibration of a radar system in response to receipt of radar return signals of varying power levels.

In an embodiment, the method further includes providing an overdriven reference range profile generated from a reference radar return signal having a power arranged to cause a radar receiver to operate in saturation, and generating the third control signal includes: determining a difference between a power at a range shorter than a peak corresponding to the modulation feature in the range profile and a power at a corresponding range of the overdriven reference range profile; obtaining a gain variation value in dependence on the difference; and generating a third control signal arranged to cause the gain to be changed by the gain variation value before generation of the subsequent range-Doppler target image signature.

In an embodiment, determining the difference between a power at a range shorter than a peak corresponding to the modulation feature in the range profile and a power at a corresponding range of the reference range profile includes generating and transmitting a gain re-set signal arranged to re-set the gain to a default value following generation of each RDI signature. The third control signal is transmitted after the gain re-set signal so that the gain variation value is applied following re-setting of the gain. The method may therefore ensure that the gain is re-set to an appropriate level that will allow radar return signals having a lower power than the previously received radar return signal to be detected.

In an embodiment, the range-Doppler target image signature includes a high range resolution range-Doppler target image signature.

A second aspect of the disclosure provides a method of controlling the provision of a range-Doppler target image signature of a target, the method including:

receiving a range-Doppler target image signature of a target;

identifying a spectral line within the range-Doppler target image signature from a modulation feature on the target which has an effective point scatterer;

providing a range profile for the return from the modulation feature;

obtaining a reference range profile of a reference point scatterer; and determining a difference between a power at a range shorter than a peak corresponding to the modulation feature in the range profile and a power at a corresponding range of the reference range profile.

In an embodiment, the method includes controlling provision of the range-Doppler target image signature based on the difference.

In an embodiment, the method includes:

determining whether the difference is above a threshold value; and where the difference is not above the threshold value, generating a first control signal arranged to cause provision of the range-Doppler target image signature, and, where the difference is above the threshold value, generating a second control signal arranged to prevent provision of the range-Doppler target image signature.

The method is able to determine whether the received RDI signature has suffered any time sidelobe distortion and to control the provision of the RDI signature in dependence on whether distortion has occurred; if distortion is determined to have occurred, provision of the RDI signature is prevented, and if distortion is determined not to have occurred, provision of the RDI signature is enabled. The method may be used to ensure that an RDI signature that is to be used for feature extraction and target recognition is only provided if the RDI signature has not suffered any time sidelobe distortion. The method may allow the quality of an RDI signature to be assessed based on the RDI signature itself, with no additional measurements needed beyond provision of the reference range profile.

In an embodiment, identifying a spectral line includes:

identifying one or more spectral lines having a signal power peak;

generating a range profile for each said spectral line; and selecting a said spectral line having a range profile having a primary power peak and one or more secondary power peaks, and each said secondary power peak located at a shorter range that the primary power peak having a substantially lower power that the primary power peak.

It has been observed from measurement and analysis of RDI signatures of aircraft corresponding to the "front" of the target, nearest the radar, that strong modulation returns from JEM lines, scanning antennae, rotors and propellers appear as point targets. Hence, "in front" of these modulation sources in the direction of the radar the range profile tends to be due to the inherent time sidelobes of the radar and not due to other modulation sources or scatterers. Any multi-path effects present occur "behind" these strong modulation sources resulting in the range profile beyond the radar being a combination of the inherent time sidelobes characteristics of the radar and the multi-path reflections. This means that the range profile in front of these strong modulation scatterers is determined by the radar system's time sidelobes and measuring these characteristics may be used to determine whether the radar signal is being distorted, due to high power signals, for example.

In an embodiment, identifying one or more spectral lines includes selecting the or each of the identified spectral lines corresponding to a modulation feature not located on a skin of the target. It has been determined that there are typically a large number of skin scatterers on the skin of an aircraft and the resulting range profile is complex. As a result, no meaningful time sidelobe characteristic can be extracted from the RDI signature if skin scatterers are used. Using a non-skin scatterer ensures that a usefully simple range profile can be generated.

In an embodiment, selecting a said spectral line includes selecting the spectral line having the highest signal power peak and the said range profile. Using the highest signal power peak may ensure that the secondary power peaks have a substantially lower power that the primary power peak.

In an embodiment, the spectral line includes one of: a jet engine modulation spectral line, a rotor chopping line, a propeller chopping line and a reflection from a scanning antenna. These modulation features act as strong point targets. A jet engine modulation (JEM) line in particular has a relatively simple range profile.

In an embodiment, the reference range profile includes a range profile of a modulation feature of a reference target having an effective point scatterer. The range profile of a spectral line from a modulation feature of a reference target may provide a better reference profile, having sharper resolution peak and lower time sidelobes, than a range profile generated from a remote point target, a remote delay line transponder, or a closed loop transponder.

In an embodiment, the spectral line is identified as being from a modulation feature having an effective point scatterer by: determining a difference between the range width of a primary power peak of a range profile of the spectral line and the range width of a corresponding power peak of the reference range profile; determining whether the difference is above a threshold value; and if the difference is not above the threshold value, identifying the said spectral line as being from a modulation feature having an effective point scatterer.

In an embodiment, the range width includes the full width of the power peak at the 3 dB power point of the peak and the threshold value includes 10 percent of the range width of the power peak of the reference range profile.

In an embodiment, prior to receiving a range-Doppler target image signature of a target. the method includes applying a gain to the range-Doppler target image signature of a target, and the second control signal is further arranged to change a gain to be applied to generate a further range-Doppler target image signature. The method may thus be used to control the gain applied during generation of a subsequent RDI signature. If time sidelobe distortion is determined to have occurred, the method may enable the gain applied during generation of the subsequent RDI signature to be reduced in order to mitigate the distortion. It will be appreciated that gain here includes both positive gain and negative gain (attenuation), and changing the gain to reduce the power of the returns in a subsequent RDI signature may therefore include reducing a positive gain or increasing a negative gain.

In an embodiment, the reference range profile includes a linear reference range profile generated from a first radar return signal having a first signal power arranged to cause a radar receiver to operate linearly and the method further includes providing an overdriven reference range profile generated from a second radar return signal having a second, higher power arranged to cause the radar receiver to operate in saturation.

In an embodiment, the range-Doppler target image signature includes a high range resolution range-Doppler target image signature.

A third aspect of the disclosure provides a radar system including:

receiver apparatus arranged to receive a radar return signal and to generate a range-Doppler target image signature; and a controller arranged to:

select a spectral line within the range-Doppler target image signature from a modulation feature on the target which includes an effective point scatterer;

provide a range profile for the spectral line;

obtain a reference range profile of a reference point scatterer; and determine a difference between a power at a range shorter than a peak corresponding to the modulation feature in the range profile and a power at a corresponding range of the reference range profile.

In an embodiment, the controller is arranged to control provision of the range-Doppler target image signature based on the difference.

In an embodiment, the controller is further arranged to:

determine whether the difference is above a threshold value; and where the difference is not above the threshold value, generate a first control signal arranged to cause provision of the range-Doppler target image signature, and, where the difference is above the threshold value, generate a second control signal arranged to prevent provision of the range-Doppler target image signature.

The radar system is able to determine whether the RDI signature has suffered any time sidelobe distortion and to control the provision of the RDI signature in dependence on whether distortion has occurred; if distortion is determined to have occurred, provision of the RDI signature is prevented, and if distortion is determined not to have occurred, provision of the RDI signature is enabled. The radar system may be operated in a manner that ensures that an RDI signature that is to be used for feature extraction and target recognition is only provided if the RDI signature has not suffered any time sidelobe distortion. The radar system may be able to assess the quality of an RDI signature based on the RDI signature itself, with no additional measurements needed beyond provision of the reference range profile.

In an embodiment, the controller is arranged to provide a range profile for the spectral line by the following process:

identify one or more spectral lines having a signal power peak;

generate a range profile for each said spectral line; and select a said spectral line having a range profile having a primary power peak and one or more secondary power peaks, and each said secondary power peak located at a shorter range that the primary power peak having a substantially lower power that the primary power peak.

It has been observed from measurement and analysis of RDI signatures of aircraft corresponding to the "front" of the target, nearest the radar, that strong modulation returns from JEM lines, scanning antennae, rotors and propellers appear as point targets. Hence, "in front" of these modulation sources in the direction of the radar the range profile tends to be due to the inherent time sidelobes of the radar and not due to other modulation sources or scatterers. Any multipath effects present occur "behind" these strong modulation sources resulting in the range profile beyond the radar being a combination of the inherent time sidelobes characteristics of the radar and the multi-path reflections. This means that the range profile in front of these strong modulation scatterers is determined by the radar system's time sidelobes and measuring these characteristics may be used to determine whether the radar signal is being distorted, due to high power signals, for example.

In an embodiment, the controller is further arranged to identify one or more spectral lines, in that it is arranged to select the or each of the identified spectral lines corresponding to a modulation feature not located on a skin of the target. It has been determined that there are typically a large number of skin scatterers on the skin of an aircraft and the resulting range profile is complex. As a result, no meaningful time sidelobe characteristic can be extracted from the RDI signature if skin scatterers are used. Using a non-skin scatterer ensures that a usefully simple range profile can be generated.

In an embodiment, the controller is further arranged to select a said spectral line, in that it is arranged to select the spectral line having the highest signal power peak and the said range profile. Using the highest signal power peak may ensure that the secondary power peaks have a substantially lower power that the primary power peak.

In an embodiment, the controller is arranged to select a spectral line having one of: a jet engine modulation spectral line, a rotor chopping line, a propeller chopping line and a reflection from a scanning antenna. These modulation features act as strong point targets. A jet engine modulation (JEM) line in particular has a relatively simple range profile.

In an embodiment, the reference range profile includes a range profile of a spectral line from a modulation feature of a reference target having an effective point scatterer. The range profile of a spectral line from a modulation feature of a reference target may provide a better reference profile, having sharper resolution peak and lower time sidelobes, than a range profile generated from a remote point target, a remote delay line transponder, or a closed loop transponder.

In an embodiment, the controller is arranged to identify the spectral line as being from a modulation feature having an effective point scatterer by: determining a difference between the range width of a primary power peak of a range profile of the spectral line and the range width of a corresponding power peak of the reference range profile; determining whether the difference is above a threshold value; and if the difference is not above the threshold value, identifying the said spectral line as being from a modulation feature having an effective point scatterer.

In an embodiment, the range width includes the full width of the power peak at the 3 dB power point of the peak and the threshold value includes 10 percent of the range width of the power peak of the reference range profile.

In an embodiment, the controller is arranged to determine whether the difference is above a threshold value, in that it is arranged to determine a mean difference between powers at plurality of range cells at ranges shorter than a peak corresponding to the modulation feature in the range profile and powers at a corresponding plurality of range cells of the reference range profile.

In an embodiment, the radar system further includes signal power control apparatus arranged to apply a gain to the range-Doppler target image signature and the controller is further arranged to generate and transmit a third control signal arranged to change the gain applied by the signal power control apparatus to reduce the power of the returns in a subsequent range-Doppler target image signature. The radar system may therefore control the gain applied during generation of an RDI signature and can change the gain between a first RDI signature and a subsequent RDI signature. If time sidelobe distortion is determined to have occurred, the radar system may enable the gain applied during generation of the subsequent RDI signature to be reduced in order to mitigate the distortion. It will be appreciated that gain here includes both positive gain and negative gain (attenuation), and changing the gain to reduce the power of the returns in a subsequent RDI signature may therefore comprise reducing a positive gain or increasing a negative gain. The radar system may therefore be dynamically calibrated to take account of changing power levels of received radar return signals.

In an embodiment, the controller is further arranged to provide an overdriven reference range profile generated from a reference radar return signal having a power arranged to cause a radar receiver to operate in saturation, and the controller is arranged to generate the third control signal by: determining a difference between a power at a range shorter than a peak corresponding to the modulation feature in the range profile and a power at a corresponding range of the overdriven reference range profile; obtaining a gain value in dependence on the difference; and generating a third control signal arranged to cause a gain of the gain value to be applied during generation of the subsequent range-Doppler target image signature.

In an embodiment, the controller is further arranged to generate a re-set signal arranged to re-set the gain to a default value following generation of each RDI signature. The controller is arranged to transmit the third control signal after transmitting the re-set signal so that gain variation value is applied following re-setting of the gain. The method may therefore ensure that the gain is re-set to an appropriate level that will allow radar return signals having a lower power than the previously received radar return signal to be detected.

In an embodiment, the system includes a high range resolution range-Doppler target radar system.

BRIEF DESCRIPTION OF THE DRAWINGS

Embodiments of the disclosure will now be described in detail, by way of example only, with reference to the accompanying drawings, in which.

DETAILED DESCRIPTION

Figure 1:
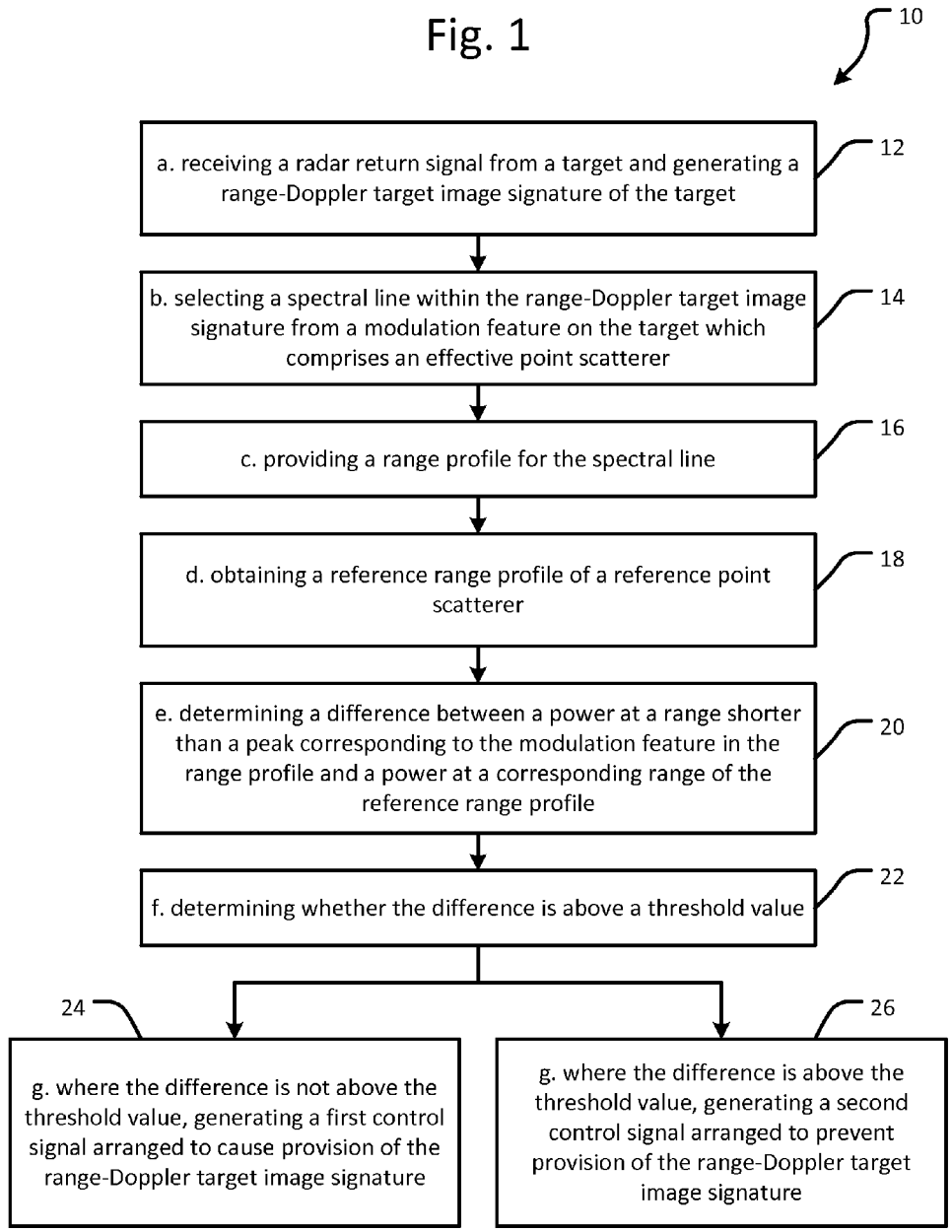
FIG. 1 is a flow chart of a method of controlling a radar system according to a first embodiment of the disclosure.

Referring to FIGS. 1 to 5, a first embodiment of the disclosure provides a method 10 of controlling a radar system.

The method 10 includes:

receiving a radar return signal from a target and generating a range-Doppler target image signature of the target 12;

selecting a spectral line within the range-Doppler target image signature from a modulation feature on the target which includes an effective point scatterer 14;

providing a range profile for the spectral line 16;

obtaining a reference range profile of a reference point scatterer 18; and determining a difference between a power at a range shorter than a peak corresponding to the modulation feature in the range profile and a power at a corresponding range of the reference range profile 20.

In some embodiments, the method 10 further includes:

determining whether the difference is above a threshold value 22; and where the difference is not above the threshold value, generating a first control signal arranged to cause provision of the range-Doppler target image signature 24, and, where the difference is above the threshold value, generating a second control signal arranged to prevent provision of the range-Doppler target image signature 26.

The method may be used in real time to control a radar system to ensure that only RDI signatures that have not been distorted are output.

Again referring to FIG. 1, a second embodiment of the disclosure provides a method of controlling a radar system that is similar to the method 10 of the first embodiment, with the following modifications.

In this embodiment, selecting a spectral line within the range-Doppler target image signature from a modulation feature on the target which includes an effective point scatterer 14 includes:

identifying one or more spectral lines having a signal power peak;

generating a range profile for each said spectral line; and selecting a said spectral line having a range profile having a primary power peak and one or more secondary power peaks, and each said secondary power peak located at a shorter range that the primary power peak having a substantially lower power that the primary power peak.

In some embodiments, each identified spectral line corresponds to a modulation feature not located on a skin of the target. Because there are typically a large number of skin scatterers on the skin of a target aircraft, and the resulting range profile is therefore complex, no meaningful time sidelobe characteristic can be extracted from a single RDI signature using a skin scatterer.

In some embodiments, the spectral line having the highest signal power peak is selected that has the desired range profile characteristics.

The selected spectral line is checked to confirm that is generated from a modulation feature that includes an effective point scatterer. This is done by determining a difference between the range width of the primary power peak of the range profile of the spectral line and the range width of the peak of the reference range profile. In this example, the range width includes the full width of the power peak at the 3 dB power point of the primary peak, i.e. the full-width half maximum (FWHM) of the primary peak. The difference is compared to a threshold value, which in this example includes 10% of the range width of the power peak of the reference range profile, to determine whether it is above the threshold value. If the difference is not above the threshold value, the said spectral line is identified as being from a modulation feature having an effective point scatterer.

It has been observed from measurement and analysis of RDI signatures of aircraft corresponding to the "front" of the target, nearest the radar, that strong modulation returns from JEM lines, scanning antennae, rotors and propellers appear as point targets. Hence, "in front" of these modulation sources in the direction of the radar the range profile tends to be due to the inherent time sidelobes of the radar and not due to other modulation sources or scatterers. Any multi-path effects present occur "behind" these strong modulation sources resulting in the range profile beyond the radar being a combination of the inherent time sidelobes characteristics of the radar and the multi-path reflections. This means that the range profile in front of these strong modulation scatterers is determined by the radar system's time sidelobes and measuring these characteristics may be used to determine whether the radar signal is being distorted, due to high power signals, for example.

Figure 2:
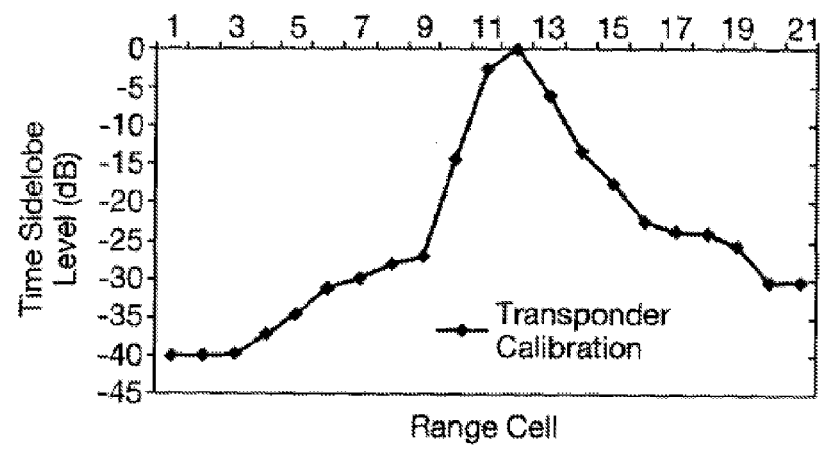
FIG. 2 shows a reference range profile of a reference point target generated using a remote delay line transponder.

An example reference range profile of a reference point scatterer that may be used with the methods of first and second embodiment is shown in FIG. 2. In this example, the reference range profile has been generated using a remote delay line transponder. The use of a remote delay line transponder to provide a calibration or reference range profile of a radar will be well know to the person skilled in the art and so it will not be described in detail here. The range profile has a clear primary peak extending over range cells 10-14 and the power level of the return in the profile at ranges shorter than the primary peak (range cells 0-9) are significantly below the level of the primary peak. The reference range profile can therefore be said to have good time sidelobe performance. The returns at ranges longer than the primary peak are not of interest here as it is not possible to determine whether the returns are multipath returns or real returns, and so they cannot be relied upon.

Figure 3:
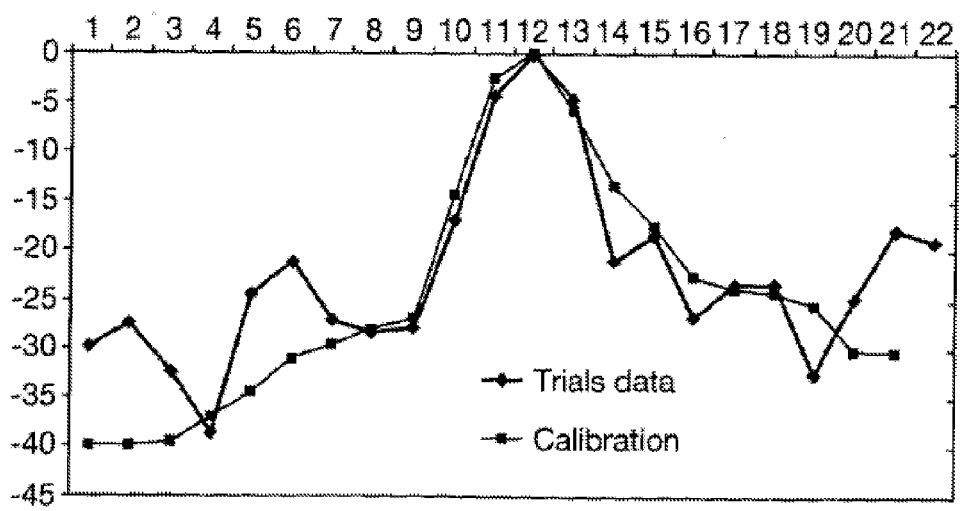
FIG. 3 shows: a) (diamonds) a range profile of a JEM spectral line of a target; and b) (squares) the reference range profile of FIG. 2.

FIG. 3 shows a range profile of a JEM spectral line of a business jet, (diamond shaped data points) and the reference range profile of FIG. 2 (square shaped data points). A JEM spectral line is chosen as a modulation feature because the range profile for a single JEM spectral line is relative simple as JEM returns only come from the aircraft engines. A particular JEM spectral line (chopping line) is generated by a particular engine at a location appropriate to the compressor blade stage that generates it. JEM lines tend to be well localised.

A JEM spectral line is preferable to a skin return (from a scatterer on the skin of the target) because there are typically a large number of skin scatterers on the skin of a target aircraft and the resulting range profile is complex. As a result no meaningful time sidelobe characteristic can be extracted from a single RDI signature.

As can be seen from FIG. 3, the shape of the range profile of the JEM spectral line around its primary peak, in range cells 8-14, is in good agreement with the peak of the reference range profile. The range resolution of the JEM spectral line range profile is very close to the reference range profile and the close agreement of the shapes of the peaks of the profiles indicates that the JEM spectral line is acting as an effective point scatterer. There is no evidence of degradation of the range profile due to the presence of a second engine on the business jet or due to multipath returns.

Analysis of many JEM spectral line range profiles has shown that the shape of their primary peak does not tend to be distorted when the radar receiver is overdriven, i.e. driven into non-linear operation, by receiving a high power radar return signal. Only the secondary peaks (time sidelobes) are affected during non-linear operation of a radar receiver. It can be seen that at range cells 2, 6 and 21 the power levels of the JEM spectral line are over 10 dB higher than the reference range profile. For a JEM spectral line it has been determined that the primary peak tends to be well localised and there is no mechanism for a high level return to occur before the primary peak unless distortion is present in the radar receiver. It has been realised that it can therefore be concluded that the secondary peaks at range cells 2 and 6 are due to radar receiver saturation. It cannot be determined whether the return at range cell 21 is due to radar saturation, a second engine return or multipath returns. The secondary returns at ranges shorter than the primary peak in the JEM spectral line range profile have therefore been identified as being useable as measures of the presence of distortion.

The level of degradation of JEM spectral line time sidelobes (secondary peaks in the range profile) has been determined to be strongly correlated with an apparent deviation of the return signal received from the target from the fourth power of the target range.

Figure 4:
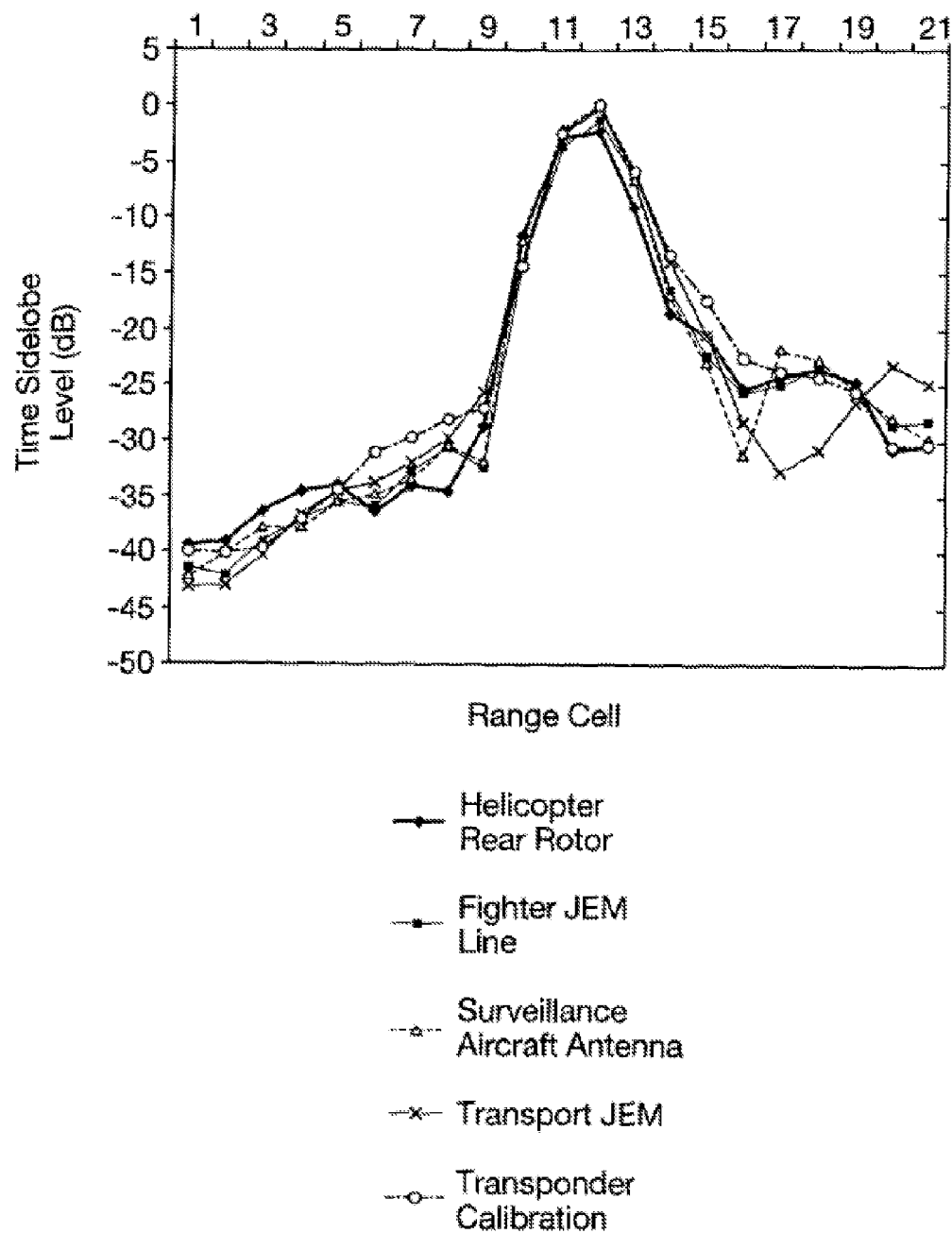
FIG. 4 shows: a) (diamonds) a range profile of a chopping line of a helicopter rear rotor; b) (squares) a range profile of a JEM spectral line of a fighter jet; c) (triangles) a range profile of a spectral line from a scanning antenna of a surveillance aircraft; d) (crosses) a range profile of a JEM spectral line of a transport aircraft; and e) (stars) the reference range profile of FIG. 2.

The modulation feature may alternatively comprise a rotor chopping line, a propeller chopping line or a reflection from a scanning antenna. FIG. 4 shows range profiles for each of a range profile of a chopping line of a helicopter rear rotor (diamonds), a range profile of a JEM spectral line of a fighter jet (squares), a range profile of a spectral line from a scanning antenna of a surveillance aircraft (triangles), a range profile of a JEM spectral line of a transport aircraft (crosses), and the reference range profile of FIG. 2 (stars).

The modulation features were selected based on their signal strength and their location within the RDI signature. The strongest spectral line of each modulation feature was selected for use. The test for determining whether the selected spectral line corresponded to the modulation feature acting as an effective point scatterer was applied, comparing the width of the primary peak of the range profile of each spectral line with that of the reference range profile and checking that the range profile does not include any other strong scatterers (secondary peaks) from any other part of the target nearer to the radar (i.e. at ranges shorter than that of the primary peak), as described above.

As can be seen in FIG. 4, between range cells 4 and 15 the range profile, and thus the time sidelobe characteristics, of the modulation features are similar to or better than the reference range profile from the remote delayed line transponder point scatterer.

A third embodiment of the disclosure provides a method of controlling a radar system that is similar to the method of the second embodiment, with the following modifications.

In this embodiment, the reference range profile is a range profile of a spectral line from a modulation feature of a reference target, which includes an effective point scatterer.

Figure 5:
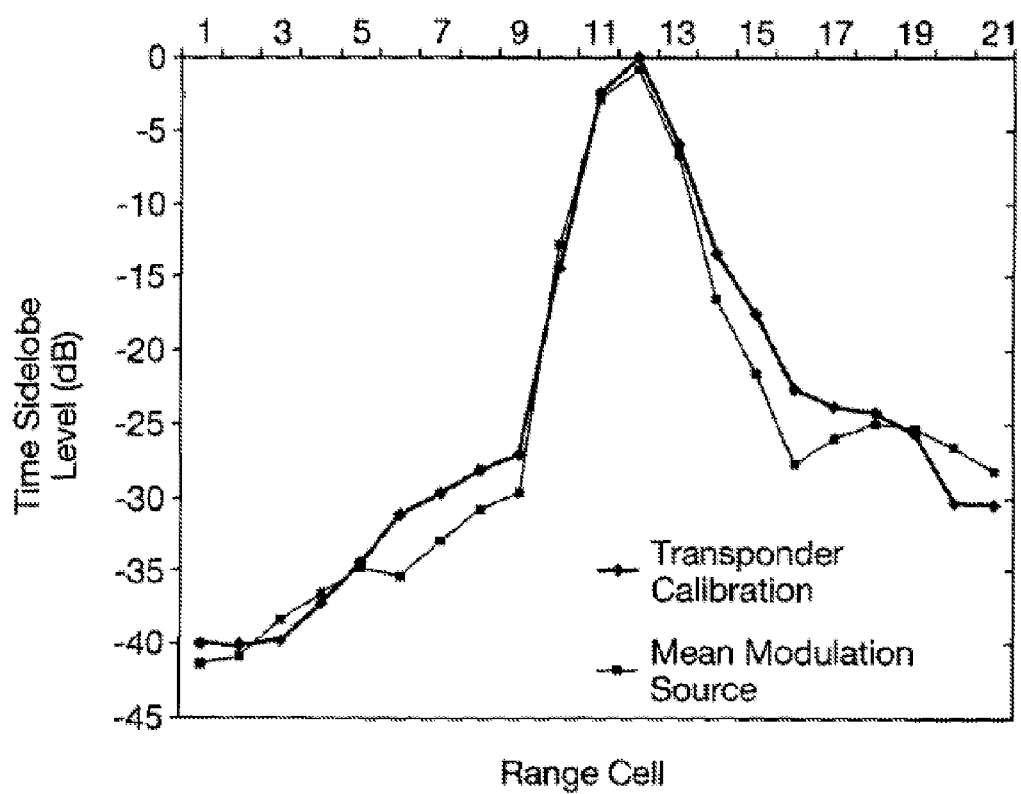
FIG. 5 shows: a) (diamonds) the reference range profile of FIG. 2; and b) (squares) the mean of the range profiles a) to d) of FIG. 3.
Figure 6:
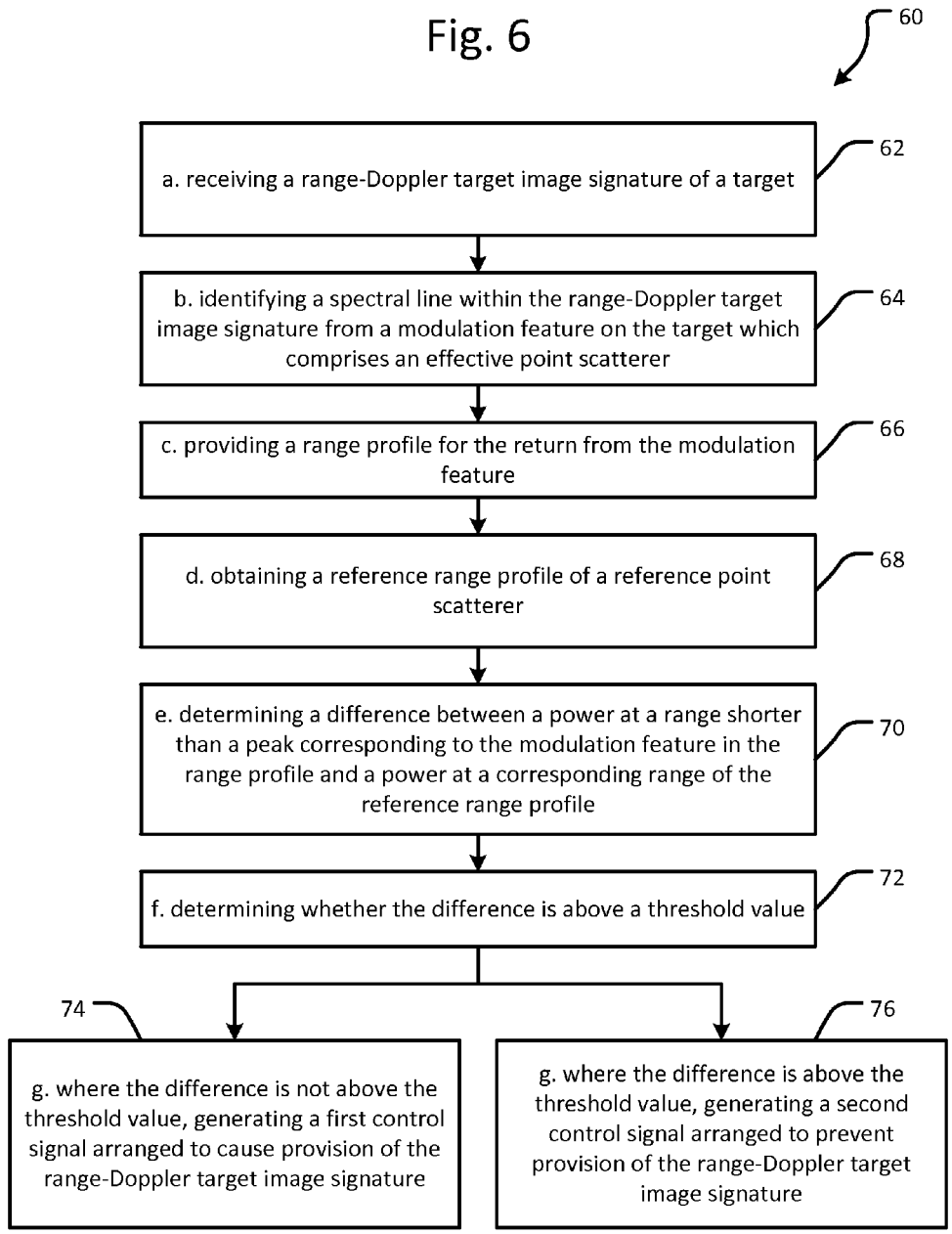
FIG. 6 is a flow chart of a method of controlling the provision of a range-Doppler target image signature of a target according to a second embodiment of the disclosure.

The mean range profile (square data points) of the modulation features of FIG. 4 is shown in FIG. 5. It can be seen that there is generally good agreement with the reference range profile (diamond data points). The modulation features can therefore be identified as acting as effective point scatterers.

The modulation features have a slightly sharper resolution primary peak and slightly lower secondary peaks (time sidelobes) on average than the reference range profile. Remarkably, the modulation features therefore provide better reference range profiles than the remote delayed line transponder.

Using a modulation feature on a target to generate a reference range profile therefore provides a representative and accurate reference range profile.

A fourth embodiment of the disclosure provides a method of controlling a radar system that is similar to the method of the second embodiment, with the following modifications.

In this embodiment, determining the difference between a power at a range shorter than a peak corresponding to the modulation feature in the range profile and a power at a corresponding range of the reference range profile includes determining a mean difference between powers at plurality of range cells at ranges shorter than a peak corresponding to the modulation feature in the range profile and powers at a corresponding plurality of range cells of the reference range profile.

A fifth embodiment of the disclosure provides a method of controlling a radar system that is similar to the method of the second embodiment, with the following modifications.

In this embodiment, receiving a radar return signal from a target and generating a range-Doppler target image signature of the target 12 includes generating the RDI signature further includes applying a gain and the method further includes generating and transmitting a third control signal arranged to change the gain to reduce the power of the returns in a subsequent RDI signature.

An overdriven reference range profile is provided that has been generated from a reference radar return signal having a power arranged to cause a radar receiver to operate in saturation. The third control signal is generated by determining a difference between a power at a range shorter than the primary peak in the JEM spectral line range profile and a power at a corresponding range of the overdriven reference range profile. The difference indicates the level of time sidelobe saturation that has occurred. Typically the difference is determined by comparing the power of a secondary peak in the JEM spectral line range profile with the power level at the corresponding range in the overdriven reference range profile. Based on the difference, a gain variation value is obtained. In this example, the gain variation value is obtained from a look-up table of the received radar return signal power as a function of the difference. By obtaining the radar return signal power corresponding to the difference a gain variation can be calculated to reduce the radar return signal power to a level below a maximum value at which the radar receiver will operate in its linear region.

The method includes generating and transmitting a third control signal arranged to cause the gain to be changed by the gain variation value before generation of a subsequent RDI signature. It will be appreciated that gain is here understood to mean both a positive gain and a negative gain (i.e. an attenuation). In the case of a positive gain the gain will be reduced to reduce the power of the radar return signal prior to generation of the subsequent RDI signature and in the case of a negative gain (attenuation) the gain (attenuation) will be increased.

A sixth embodiment of the disclosure provides a method of controlling a radar system that is similar to the method of the previous embodiment, with the following modifications.

In this embodiment, determining a difference between a power at a range shorter than a peak corresponding to the modulation feature in the range profile and a power at a corresponding range of the reference range profile 20 includes generating and transmitting a gain re-set signal arranged to re-set the gain to a default value following generation of each RDI signature. The third control signal is transmitted after the gain re-set signal so that the gain variation value is applied following re-setting of the gain. The method may therefore ensure that the gain is re-set to an appropriate level that will allow radar return signals having a lower power than the previously received radar return signal to be detected.

It will be appreciated that the RDI signature of each of the above described embodiments may comprise a high range resolution (HRR) RDI signature, being particularly useful for feature extraction and target recognition applications.

A seventh embodiment of the disclosure provides method 60 of controlling the provision of an RDI signature of a target.

The method 60 includes:
receiving a range-Doppler target image signature of a target 62;
identifying a spectral line within the range-Doppler target image signature from a modulation feature on the target which includes an effective point scatterer 64;
providing a range profile for the return from the modulation feature 66;
obtaining a reference range profile of a reference point scatterer 68; and
determining a difference between a power at a range shorter than a peak corresponding to the modulation feature in the range profile and a power at a corresponding range of the reference range profile 70.

In some embodiments, the method 60 further includes:
determining whether the difference is above a threshold value 72; and
where the difference is not above the threshold value, generating a first control signal arranged to cause provision of the range-Doppler target image signature 74, and, where the difference is above the threshold value, generating a second control signal arranged to prevent provision of the range-Doppler target image signature 76.

The method may be used to control the provision of both current RDI signatures in real time and to select historical RDI signatures for provision, in both cases ensuring that only RDI signatures that have not been distorted are delivered.

Again referring to FIG. 1, an eighth embodiment of the disclosure provides a method of controlling provision of an RDI signature of a target, which is similar to the method 60 of the previous embodiment, with the following modifications.

In this embodiment, identifying a spectral line within the range-Doppler target image signature from a modulation feature on the target which includes an effective point scatterer 64 includes:
identifying one or more spectral lines having a signal power peak;
generating a range profile for each said spectral line; and
selecting a said spectral line having a range profile having a primary power peak and one or more secondary power peaks, and each said secondary power peak located at a shorter range that the primary power peak having a substantially lower power that the primary power peak.

In some embodiments, each identified spectral line corresponds to a modulation feature not located on a skin of the target. Because there are typically a large number of skin scatterers on the skin of a target aircraft, and the resulting range profile is therefore complex, no meaningful time sidelobe characteristic can be extracted from a single RDI signature using a skin scatterer.

In some embodiments, the spectral line having the highest signal power peak is selected that has the desired range profile characteristics.

The selected spectral line is checked to confirm that is generated from a modulation feature that includes an effective point scatterer. This is done by determining a difference between the range width of the primary power peak of the range profile of the spectral line and the range width of the peak of the reference range profile. In this example, the range width includes the full width of the power peak at the 3 dB power point of the primary peak, i.e. the full-width half maximum (FWHM) of the primary peak. The difference is compared to a threshold value, which in this example includes 10% of the range width of the power peak of the reference range profile, to determine whether it is above the threshold value. If the difference is not above the threshold value, the said spectral line is identified as being from a modulation feature having an effective point scatterer.

As discussed above in relation to FIG. 4, the modulation feature may alternatively comprise a rotor chopping line, propeller chopping line or a reflection from a scanning antenna.

A ninth embodiment of the disclosure provides a method of controlling provision of an RDI signature that is similar to the method of the previous embodiment, with the following modifications.

In this embodiment, the reference range profile is a range profile of a spectral line from a modulation feature of a reference target that includes an effective point scatterer.

The mean range profile (square data points) of the modulation features of FIG. 4 is shown in FIG. 5. It can be seen that there is generally good agreement with the reference range profile (diamond data points). The modulation features can therefore be identified as acting as effective point scatterers.

The modulation features have a slightly sharper resolution primary peak and slightly lower secondary peaks (time sidelobes) on average than the reference range profile. Remarkably, the modulation features therefore provide better reference range profiles than the remote delayed line transponder.

Using a modulation feature on a target to generate a reference range profile therefore provides a representative and accurate reference range profile.

A tenth embodiment of the disclosure provides a method of controlling provision of an RDI signature that is similar to the method of the seventh embodiment, with the following modifications.

In this embodiment, determining a difference between a power at a range shorter than a peak corresponding to the modulation feature in the range profile and a power at a corresponding range of the reference range profile 70 includes determining a mean difference between powers at a plurality of range cells at ranges shorter than a peak corresponding to the modulation feature in the range profile and powers at a corresponding plurality of range cells of the reference range profile.

It will be appreciated that the RDI signature of each of the above described embodiments may comprise a high range resolution (HRR) RDI signature, being particularly useful for feature extraction and target recognition applications.

Figure 7:
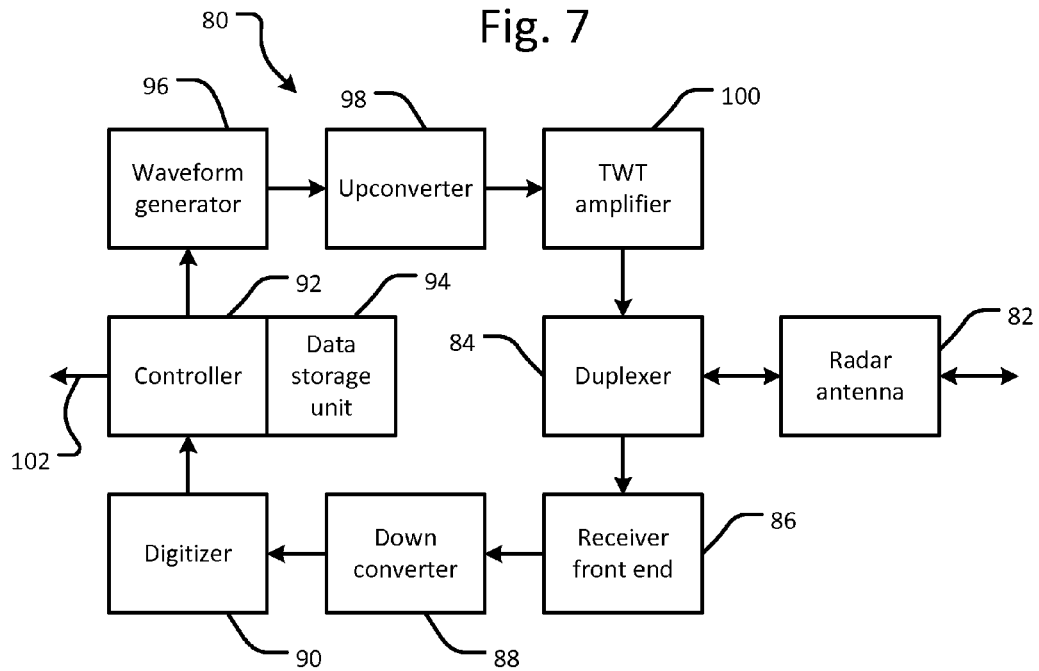
FIG. 7 is a schematic representation of a radar system according to a tenth embodiment of the disclosure.

An eleventh embodiment of the disclosure provides a radar system 80, as shown in FIG. 7.

The radar system 80 includes:
receiver apparatus 82, 84, 86, 88, 90 arranged to receive a radar return signal and to generate an RDI signature; and
a controller 92 arranged to:
select a spectral line within the RDI signature from a modulation feature on the target which includes an effective point scatterer;
provide a range profile for the spectral line;
obtain a reference range profile of a reference point scatterer; and
determine a difference between a power at a range shorter than a peak corresponding to the modulation feature in the range profile and a power at a corresponding range of the reference range profile.

In some embodiments, the controller 92 is further arranged to:
determine whether the difference is above a threshold value; and
where the difference is not above the threshold value, generate a first control signal arranged to cause provision of the RDI signature, and, where the difference is above the threshold value, generate a second control signal arranged to prevent provision of the RDI signature.

The receiver apparatus of this example includes a radar antenna 82 arranged to receive a radar return signal, a duplexer 84, a receiver front end 86, a down converter 88 and a digitiser 90.

The receiver front end 86 includes a low noise amplifier that establishes a low noise figure and provides high sensitivity performance to the radar system 80.

The controller 92 in this example includes a computer but it will be appreciated that a programmable microcontroller or microprocessor may alternatively be used. The controller 92 is provided with a data storage unit 94, which here includes the RAM memory of the computer, in which the reference range profile is stored and from where the reference range profile is obtained by the controller 92.

For completeness, the transmission side of the radar system 80 is also shown but it does not form part of this embodiment. The transmission side includes a waveform generator 96, an upconverter 98, and a TWT amplifier 100. The duplexer 84 and antenna 82 additionally form part of the transmission side of the radar system.

Where the difference is not above the threshold value, the first control signal causes the RDI signature to be provided within an output signal 106. Where the difference is above the threshold value, the second control signal prevents provision of the RDI signature. The RDI signature is therefore not output from the radar system 80.

Figure 8:
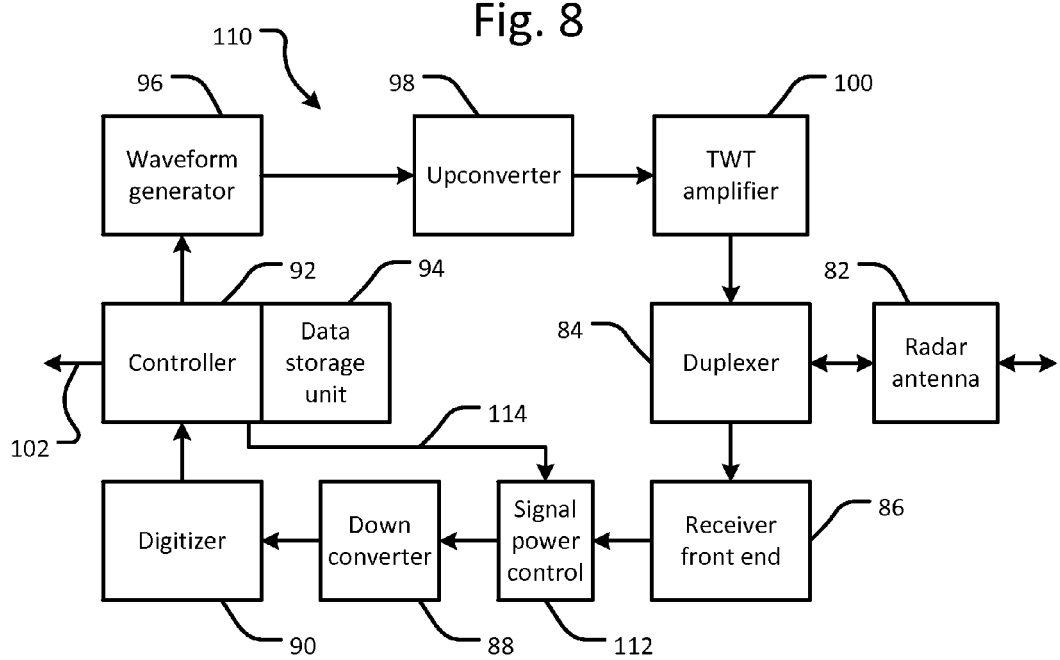
FIG. 8 is a schematic representation of a radar system according to an eleventh embodiment of the disclosure.

A radar system 110 according to a twelfth embodiment of the disclosure is shown in FIG. 8. The radar system 110 of this embodiment is similar to the radar system 80 of FIG. 7, with the following modifications. The same reference numbers are retained for corresponding features.

In this embodiment, the radar system 110 further includes signal power control apparatus 112 arranged to apply a gain to the RDI signature. The signal power control apparatus 112 of this example includes a variable or programmable attenuator, and thus applies a negative gain. It will be appreciated that a variable or programmable gain element arranged to apply a positive gain may alternatively be used as the signal power control apparatus.

The controller 92 is further arranged to, where the difference is above the threshold value, generate and transmit a third control signal 114 to the signal power control apparatus 112. The third control signal 114 is arranged to change the gain applied by the signal power control apparatus 112, to reduce the power of the returns in a subsequent RDI signature.

In this example, an overdriven reference range profile is provided that has been generated from a reference radar return signal having a power arranged to cause a radar receiver to operate in saturation.

The controller 92 is arranged to generate the third control signal by: determining a difference between a power at a range shorter than the primary peak in the range profile and a power at a corresponding range of the overdriven reference range profile; obtaining a gain value in dependence on the difference; and generating a third control signal arranged to cause the gain to be changed by the gain variation value before generation of the subsequent range-Doppler target image signature.

The third control signal is generated by determining a difference between a power at a range shorter than the primary peak the range profile, for example a JEM spectral line range profile, and a power at a corresponding range of the overdriven reference range profile. The difference indicates the level of time sidelobe saturation that has occurred. Typically the difference is determined by comparing the power of a secondary peak in the JEM spectral line range profile with the power level at the corresponding range in the overdriven reference range profile. Based on the difference, a gain variation value is obtained.

In this example, a look-up table of the received radar return signal power as a function of the difference is provided in the data storage unit 94 and the gain variation value is obtained by looking up the radar return signal power corresponding to the difference. The controller is arranged to then calculate the gain variation to reduce the radar return signal power to a level below a maximum value at which the radar receiver will operate in its linear region.

In this example, the radar system 110 is arranged to generate a high range resolution (HRR) RDI signature, and the radar system 110 is therefore of particular use for feature extraction and target recognition applications.

A thirteenth embodiment of the disclosure provides a radar system having the same structure as the radar system 110 of the previous embodiment, with the following modifications.

In this embodiment, the controller 92 is further arranged to generate and transmit a re-set signal arranged to re-set the gain to a default value following generation of each RDI signature. The controller 92 is arranged to transmit the third control signal after transmitting the re-set signal so that gain variation value is applied following re-setting of the gain. The method may therefore ensure that the gain is re-set to an appropriate level that will allow radar return signals having a lower power than the previously received radar return signal to be detected.

A fourteenth embodiment of the disclosure provides a radar system having the same structure as the radar system 110 of the twelfth embodiment, with the following modifications.

In this embodiment, the controller 92 is arranged to provide a range profile for the spectral line by:
identifying one or more spectral lines having a signal power peak;
generating a range profile for each said spectral line; and
selecting a said spectral line having a range profile having a primary power peak and one or more secondary power peaks, and each said secondary power peak located at a shorter range that the primary power peak having a substantially lower power that the primary power peak.

In some embodiments, each identified spectral line corresponds to a modulation feature not located on a skin of the target. Because there are typically a large number of skin scatterers on the skin of a target aircraft, and the resulting range profile is therefore complex, no meaningful time sidelobe characteristic can be extracted from a single RDI signature using a skin scatterer.

In some embodiments, the spectral line having the highest signal power peak is selected that has the desired range profile characteristics.

The selected spectral line is checked to confirm that is generated from a modulation feature that includes an effective point scatterer, as described above.

An example reference range profile of a reference point scatterer that may be used in this embodiment is shown in FIG. 2, as described above.

The modulation feature may alternatively comprise a rotor chopping line, a propeller chopping line or a reflection from a scanning antenna, as described above in relation to FIG. 3.

A fifteenth embodiment of the disclosure provides a radar system having the same structure as the radar system 110 of FIG. 8, with the following modifications.

In this embodiment, the reference range profile is a range profile of a spectral line from a modulation feature of a reference target that includes an effective point scatterer.

As described above in relation to FIG. 4, modulation features can therefore be used as effective point scatterers.

A sixteenth embodiment of the disclosure provides a radar system having the same structure as the radar system 110 of FIG. 8, with the following modifications.

In this embodiment, the controller 92 is arranged to determine a difference between a power at a range shorter than a peak corresponding to the modulation feature in the range profile and a power at a corresponding range of the reference range profile by determining a mean difference between powers at plurality of range cells at ranges shorter than a peak corresponding to the modulation feature in the range profile and powers at a corresponding plurality of range cells of the reference range profile.

The invention claimed is:

1. A method of controlling a radar system, the method comprising:
receiving a radar return signal from a target and generating a range-Doppler target image signature of the target;
selecting a spectral line within the range-Doppler target image signature from a modulation feature on the target which comprises an effective point scatterer;
providing a range profile for the spectral line;
obtaining a reference range profile of a reference point scatterer; and
determining a difference between a power at a range shorter than a peak corresponding to the modulation feature in the range profile and a power at a corresponding range of the reference range profile.

2. The method as claimed in claim 1, further comprising controlling provision of the range-Doppler target image signature based on the difference.

3. The method as claimed in claim 1, further comprising:
determining whether the difference is above a threshold value; and
at least one of
in response to the difference not being above the threshold value, generating a first control signal arranged to cause provision of the range-Doppler target image signature, and
in response to the difference being above the threshold value, generating a second control signal arranged to prevent provision of the range-Doppler target image signature.

4. The method as claimed in claim 1, wherein selecting a spectral line comprises:
identifying one or more spectral lines comprising a signal power peak;
generating a range profile for each said spectral line; and
selecting a said spectral line having a range profile comprising a primary power peak and one or more secondary power peaks, and each said secondary power peak located at a shorter range that the primary power peak having a substantially lower power that the primary power peak.

5. The method as claimed in claim 4, wherein identifying one or more spectral lines comprises selecting the or each of the identified one or more spectral lines corresponding to a modulation feature not located on a skin of the target.

6. The method as claimed in claim 4, wherein selecting a said spectral line comprises selecting the spectral line comprising the highest signal power peak and the said range profile.

7. A method of controlling the provision of the range-Doppler target image signature of a target, the method comprising:
receiving a range-Doppler target image signature of a target;
identifying a spectral line within the range-Doppler target image signature from a modulation feature on the target which comprises an effective point scatterer;
providing a range profile for a return from the modulation feature;
obtaining a reference range profile of a reference point scatterer;
determining a difference between a power at a range shorter than a peak corresponding to the modulation feature in the range profile and a power at a corresponding range of the reference range profile, and
generating a control signal for changing a gain of the range-Doppler target image signature based on the difference, and transmitting the control signal to a signal power control apparatus,
wherein the signal power control apparatus is configured to be controlled by the control signal and further configured to change the gain of the range-Doppler target image signature based on the control signal.

8. The method as claimed in claim 7, further comprising:
determining whether the difference is above a threshold value; and
where the difference is not above the threshold value, generating a first control signal arranged to cause provision of the range-Doppler target image signature, and, where the difference is above the threshold value, generating a second control signal arranged to prevent provision of the range-Doppler target image signature.

9. The method as claimed in claim 7, wherein identifying a spectral line comprises:
identifying one or more spectral lines comprising a signal power peak;
generating a range profile for each said spectral line; and
selecting a said spectral line having a range profile comprising a primary power peak and one or more secondary power peaks, and each said secondary power peak located at a shorter range that the primary power peak having a substantially lower power that the primary power peak.

10. The method as claimed in claim 9, wherein identifying one or more spectral lines further comprises selecting the or each of the identified one or more spectral lines corresponding to a modulation feature not located on a skin of the target.

11. The method as claimed in claim 9, wherein selecting a said spectral line comprises: selecting the spectral line comprising a highest signal power peak and the said range profile.

12. The method as claimed in claim 7, further comprising:
applying a gain to the range-Doppler target image signature of a target; and
changing the gain to be applied to generate a further range-Doppler target image signature based on the difference.

13. The method as claimed in claim 7, wherein the reference range profile comprises a linear reference range profile generated from a first radar return signal having a first signal power arranged to cause a radar receiver to operate linearly, and wherein the method further comprises providing an overdriven reference range profile generated from a second radar return signal having a second, higher power arranged to cause the radar receiver to operate in saturation.

14. A radar system comprising:
receiver apparatus arranged to receive a radar return signal and to generate a range-Doppler target image signature; and
a controller configured to:
select a spectral line within the range-Doppler target image signature from a modulation feature on the target which comprises an effective point scatterer;
provide a range profile for the spectral line;
obtain a reference range profile of a reference point scatterer; and
determine a difference between a power at a range shorter than a peak corresponding to the modulation feature in the range profile and a power at a corresponding range of the reference range profile.

15. The radar system as claimed in claim 14, wherein the controller is further configured to control provision of the range-Doppler target image signature based on the difference.

16. The radar system as claimed in claim 14, wherein the controller is further configured to:
determine whether the difference is above a threshold value; and
at least one of
in response to the difference not being above the threshold value, generate a first control signal arranged to cause provision of the range-Doppler target image signature, and
in response to the difference being above the threshold value, generate a second control signal arranged to prevent provision of the range-Doppler target image signature.

17. The radar system as claimed in claim 14, wherein the controller is further configured to:
identify one or more spectral lines comprising a signal power peak;
generate a range profile for each said spectral line; and
select a said spectral line having a range profile comprising a primary power peak and one or more secondary power peaks, such that each said secondary power peak located at a shorter range that the primary power peak has a substantially lower power that the primary power peak.

18. The radar system as claimed in claim 17, wherein the controller is further configured to:
select the or each of the identified spectral lines corresponding to a modulation feature not located on a skin of the target.

19. The radar system as claimed in claim 17, wherein the controller is further configured to:
select the spectral line comprising the highest signal power peak and the said range profile.

* * * * *